United States Patent
Shinkai et al.

(10) Patent No.: US 6,675,176 B1
(45) Date of Patent: Jan. 6, 2004

(54) FILE MANAGEMENT SYSTEM

(75) Inventors: Yoshitake Shinkai, Kawasaki (JP); Yoshihiro Tsuchiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/397,865

(22) Filed: Sep. 17, 1999

(30) Foreign Application Priority Data

Sep. 18, 1998 (JP) .......................................... 10-264808

(51) Int. Cl.[7] .............................. G06F 17/30; H02H 3/05
(52) U.S. Cl. ........................ 707/200; 707/10; 711/114; 714/6
(58) Field of Search .............................. 707/1–6, 8, 10, 707/102, 200, 201, 202, 203, 513, 205, 500.1; 711/112, 114, 122, 157; 713/201; 714/5, 6, 7

(56) References Cited

U.S. PATENT DOCUMENTS

| | | | | |
|---|---|---|---|---|
| 5,519,844 A | * | 5/1996 | Stallmo ...................... | 711/114 |
| 5,542,065 A | | 7/1996 | Burkes et al. ............... | 711/114 |
| 5,659,704 A | * | 8/1997 | Burkes et al. ............... | 711/114 |
| 5,696,934 A | | 12/1997 | Jacobson et al. ............. | 714/5 |
| 5,708,769 A | | 1/1998 | Stallmo ........................ | 714/6 |
| 6,154,854 A | | 11/2000 | Stallmo ........................ | 714/6 |
| 6,275,898 B1 | * | 8/2001 | DeKoning ................... | 711/114 |

FOREIGN PATENT DOCUMENTS

| | | |
|---|---|---|
| JP | 02-073436 | 3/1990 |
| JP | 05-197498 | 8/1993 |
| JP | 07-036633 | 2/1995 |
| JP | 07-036634 | 2/1995 |
| JP | 07-093104 | 4/1995 |
| JP | 07-306758 | 11/1995 |
| JP | 08-044503 | 2/1996 |
| JP | 08-272548 | 10/1996 |
| JP | 09-146717 | 6/1997 |

OTHER PUBLICATIONS

English Translation of Office Action mailed by Japanese Patent Office on Aug. 13, 2002 for the corresponding Japanese Patent Application No. 10–264808.

* cited by examiner

*Primary Examiner*—Shahid Al Alam
(74) *Attorney, Agent, or Firm*—Staas & Halsey LLP (57) ABSTRACT

A file management system is capable of storing the data with a higher usability (reliability) and a higher performance by structuring files for arranging in redundancy the data on a plurality of disk devices, and utilizing characteristics of a file management program (file system) recognizing a mutual relationship between sets of data stored in the plurality of disk devices. The file management system includes a plurality of disk devices 51, 52, 53 and 54, managed in the form of a disk pool, of which at least two disk devices are dynamically selected from the disk pool, for constituting a plurality of files for storing in redundancy any one set of data of user data and meta data for managing how the user data are used, and a file system 1, constituting a part of an operating system 3 of a host computer 2, for managing the plurality of disk devices as the disk pool and managing en bloc the files, based on the meta data.

13 Claims, 5 Drawing Sheets

FILE MANAGEMENT SYSTEM

BACKGROUND OF THE INVENTION

The present invention relates generally to a file management system, and more particularly to a file management system capable of enhancing a reliability and a performance of disk devices (RAID devices), wherein the data are stored in redundancy in files on the plurality of disk devices.

A redundant array of independent disks (RAID) is well known as a method of enhancing the reliability and the performance of the data storage device. The RAID method may include a RAID level 1 method of arranging the data for duplex storage, and a RAID level 5 (or RAID level 4) method by which a plurality (N-pieces) of disk devices are used, the data are arranged in stripe in [N−1] pieces of disk devices among those disk devices, and parity data are stored in one remaining disk device. The RAID level 1 and level 5 methods are each defined as a useful technique for enhancing the reliability and the performance of the data storage device, i.e., the disk device. The RAID level 5 method might, however, induce a deterioration of the performance when a small quantity of data are written at random, although it has a high space efficiency (a low storage cost). On the other hand, the RAID level 1 method, though a high performance is exhibited when the small quantity of data are written at random, has a characteristic of the space efficiency being low. Further, both of these methods have such characteristics as to involve the use of standby disk devices which are normally unused against an occurrence of fault, require much time for re-redundancy after the fault has occurred, and have a difficulty of dynamically adding the disk device.

Examples of the technique adopting the RAID methods described above are disclosed in Japanese Patent Application Laid-Open Publication No.5-197498 (Prior Art 1), U.S. Pat. No. 5,519,844 (Prior Art 2), U.S. Pat. No. 5,708,769 (Prior Art 3), Japanese Patent Application Laid-Open Publication No.8-44503 (Prior Art 4), U.S. Pat. No. 5,696,934 (Prior Art 5), Japanese Patent Application Laid-Open Publication No.8-272548 (Prior Art 6), U.S. Pat. No. 5,542,065 (Prior Art 7), and Japanese Patent Application Laid-Open Publication No.9-146717 (Prior Art 8).

The prior arts 1, 2, 3, 6 and 7 relate to a technology by which at least one single physical disk device is contrived to appear as a plurality of logical storage devices on the side of a host computer, wherein a segmentation into the logical storage devices is static, and besides the user has no alternative but to clearly declare which logical storage device is used. Accordingly, from the user's side, there is not an essential difference from a case where the plurality of disk devices based on different redundancy methods are used by their being connected to the host computer, except for an aspect of the storage cost.

According to the prior arts 4 and 5, a plurality of logical disk devices taking different types of redundancy methods are constructed based on such a contrivance that the host computer may recognize them as one single logical storage device, the data are transferred between the different logical storage devices by use of information on an accessing frequency etc., thereby automatically determining an optimum redundancy method. According to these prior arts, the system automatically selects the redundancy method, however, the data are developed temporarily at the RAID level 1, and, after a fixed period of time has elapsed, the data of the RAID level 1 are transferred to a region of the RAID level 5, with result that an extra overhead occurs. Furthermore, a block position stored with one file is scattered in the process of the transfer from the RAID level 1 to the RAID level 5, and there might be a large possibility of invalidating performance optimization implemented by the file system, i.e., an effect obtained by storing the same file in the consecutive physical blocks as much as possible.

According to the prior art 8, in the disk device incorporating and controlling a plurality of hard disks, there is prepared beforehand an unused region (partition), whereby the redundancy is recovered by using this unused region even if a disk fault happens. Herein, the reason why the unused region is prepared is that if the region is handed over to the host computer, there might thereafter be no recognition of which block in the region is being used. This unused region must be, however, set free previously.

SUMMARY OF THE INVENTION

Accordingly, it is a primary object of the present invention to provide a file management system capable of storing the data with a higher usability (reliability) and a higher performance by structuring files for arranging in redundancy the data on a plurality of disk devices, and utilizing characteristics of a file management program (file system) recognizing a mutual relationship between sets of data stored in the plurality of disk devices.

To accomplish the above object, according to one aspect of the present invention, a file management system comprises a plurality of disk devices, managed in the form of a disk pool, of which at least two disk devices are dynamically selected from the disk pool, for constituting a plurality of files for storing in redundancy any one set of data of user data and meta data for managing how the user data are used, and a file system, constituting a part of an operating system of a host computer, for managing the plurality of disk devices as the disk pool and managing en bloc the files, based on the meta data.

In this construction, the file system, in the case of the file of less than one block, selects two of the plurality of disk devices in the disk pool, and makes the user data stored in the redundancy of a RAID level 1. Further, the file system, in the case of the file of over two blocks, selects three or more of the plurality of disk devices in the disk pool, and makes the user data stored in the redundancy of a RAID level 5. Moreover, the file system makes the meta data stored in predetermined two of the plurality of disk devices in the disk pool in the redundancy of the RAID level 1.

The meta data is stored on a file-basis with an address conversion table containing a disk number of the disk device stored with the user data, and a disk block number corresponding to an intra-disk relative block number.

If a block fault occurs in a target disk device when the file system accessing the file, a disk block group needed for recovering contents of the block with the fault is obtained from the address conversion table, the disk block group is read, the data of the block with the fault are recovered from the data read therefrom, the recovered data are written to a newly-allocated normal block in the same disk device, and the newly-allocated disk block number is reflected in the address conversion table.

If a fault of said disk device occurs, a disk block group needed for recovering contents of the block of said failed disk device is obtained from said address conversion table, the disk block group is read, the data of said failed disk device are recovered from the data read therefrom, the recovered data are written to a newly-allocated normal block in said other disk devices not used for the particular file, and the newly-allocated disk block numbers and the newly-allocated disk number are reflected in said address conversion table.

When restarted after system down, said file system reads sequentially the address conversion table in the meta data, recalculates the parity data with respect to the file in which an open indication flag is set, and writes back the recalculated parity data to the parity block in the file.

The file system caches the user data when writing the data in order to retrain an occurrence of recalculation of the parity data, and delays an allocation of the disk block till the file is closed or the cache becomes full.

According to the present invention, even in the case of the file stored in the same plurality of disk devices, the user is able to select an optimum data redundant arrangement per file in terms of considering a reliability, a performance and a storage cost. On this occasion, the user has no necessity for being ware of which disk device the data are stored in, and the system automatically determines based on a load etc.

Further, according to the present invention, if not specified by the user, with a file category and a file size being keys, the system is capable of automatically selecting on the file-basis the optimum data redundant arrangement.

Still further, according to the present invention, if the file size is changed, the system is capable of automatically changing a data redundant structure.

Yet further, according to the present invention, if a fault occurs in the disk device, the redundancy can be recovered by dynamically acquiring a free area on another disk device among the plurality of disk devices. Hence, there is no necessity for preparing any standby disk devices.

BRIEF DESCRIPTION OF THE DRAWINGS

These objects and advantages of this invention will become more apparent and more readily appreciated from the following detailed description of the presently preferred exemplary embodiments, taken in conjunction with the accompanying drawings of which.

DETAILED DESCRIPTION OF THE PREFERRED EMBODIMENTS

Figure 1:
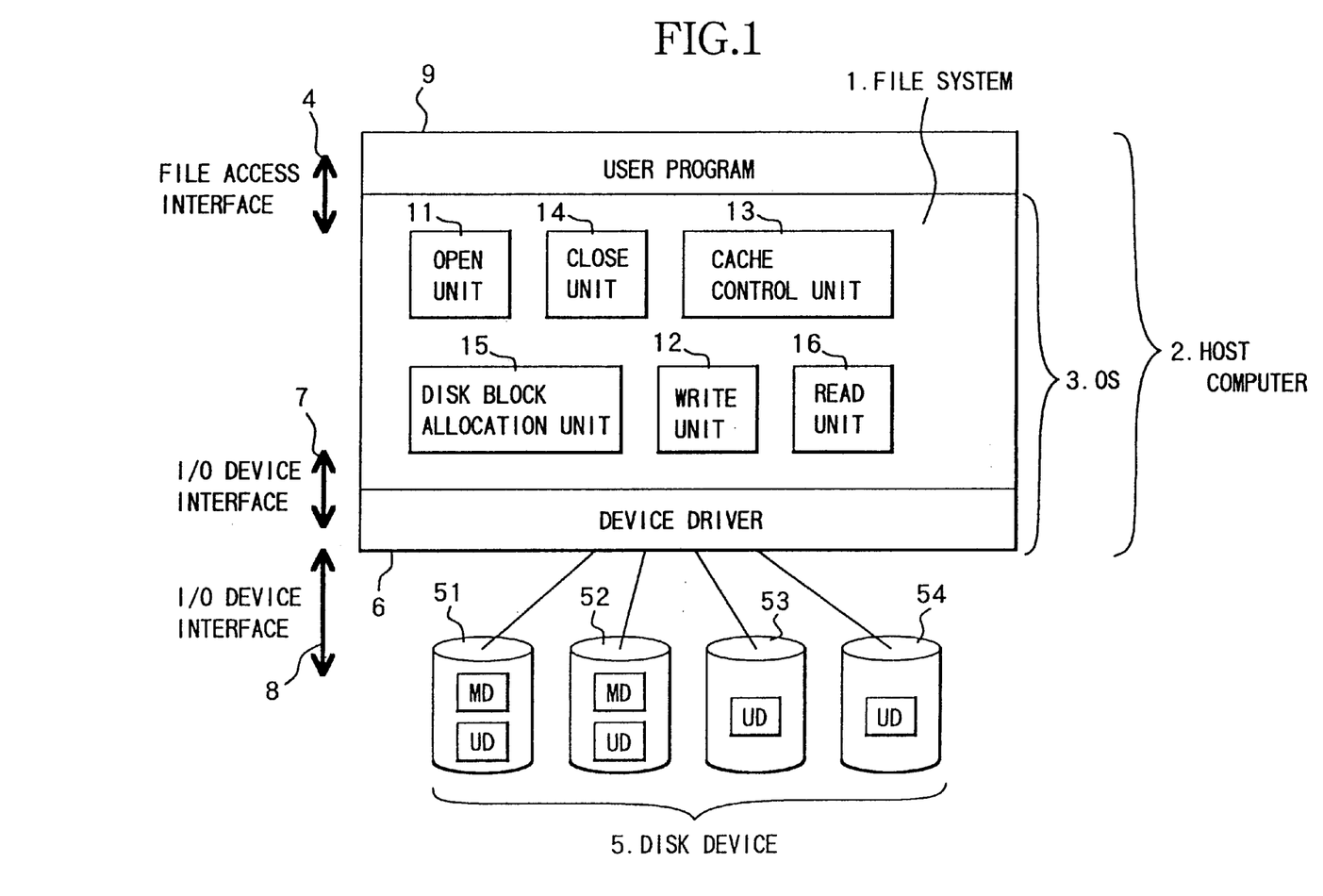
FIG. 1 is a block diagram showing an architecture of a file management system in one embodiment of the present invention.

FIG. 1 is a diagram showing an architecture in one embodiment of the present invention. Referring to FIG. 1, in a file management system, a file system 1 is a program (a file management program) constituting a part of an operating system (OS) 3 of a host computer 2, and performs a role of accepting a file access request of a user via a file access interface 4, and accessing user data UD and meta data MD on a plurality of disk devices (RAID devices) connected to the host computer 2.

The host computer 2 constitutes a node connected to a network (of which an illustration is omitted) such as a local area network (LAN). The plurality of disk devices 51 through 54 are connected to the host computer 2, and it is all assigned to the file system 1 to determine which disk device and where the user data are stored in. The file system 1, when the disk device 5 is determined as an object for a storage of the data, requests an OS3 structuring program known as a device driver 6 to input and output through an I/O device interface 7. In this interface 7, there are transferred a disk device number, and a block number and the number of blocks (a block length) in the device.

The device driver 6 is provided for cutting off an interface difference in protocol etc. between the individual disk devices 5 from the file system 1 defined as a high-level program. The device driver 6, upon receiving the request from the file system 1, converts the request into an interface intrinsic to each device, and transfers it to the disk device via the I/O device interface 8.

It is all managed by the file system 1 to recognize which block in the disk device 5 is used and which file this block is used in, and neither the disk device 5 nor the device driver 6 is capable of recognizing at all. In addition to the user data UD, pieces of management information called the meta data MD for managing how the user data UD are arranged in dispersion in a plurality of blocks of the disk device 5.

The disk device 5, after notifying the host computer 2 of a usable region (partition) when in initialization, is incapable of recognizing which block in this partition is used by the host computer 2 at all. Accordingly, the disk device 5 has no alternative but to control on the assumption that the block stored with no data (such as when stored with the user data UD before but the file is erased) is to be stored with significant data, and besides the disk device 5 has no means to recognize which blocks are related to each other.

Figure 2:
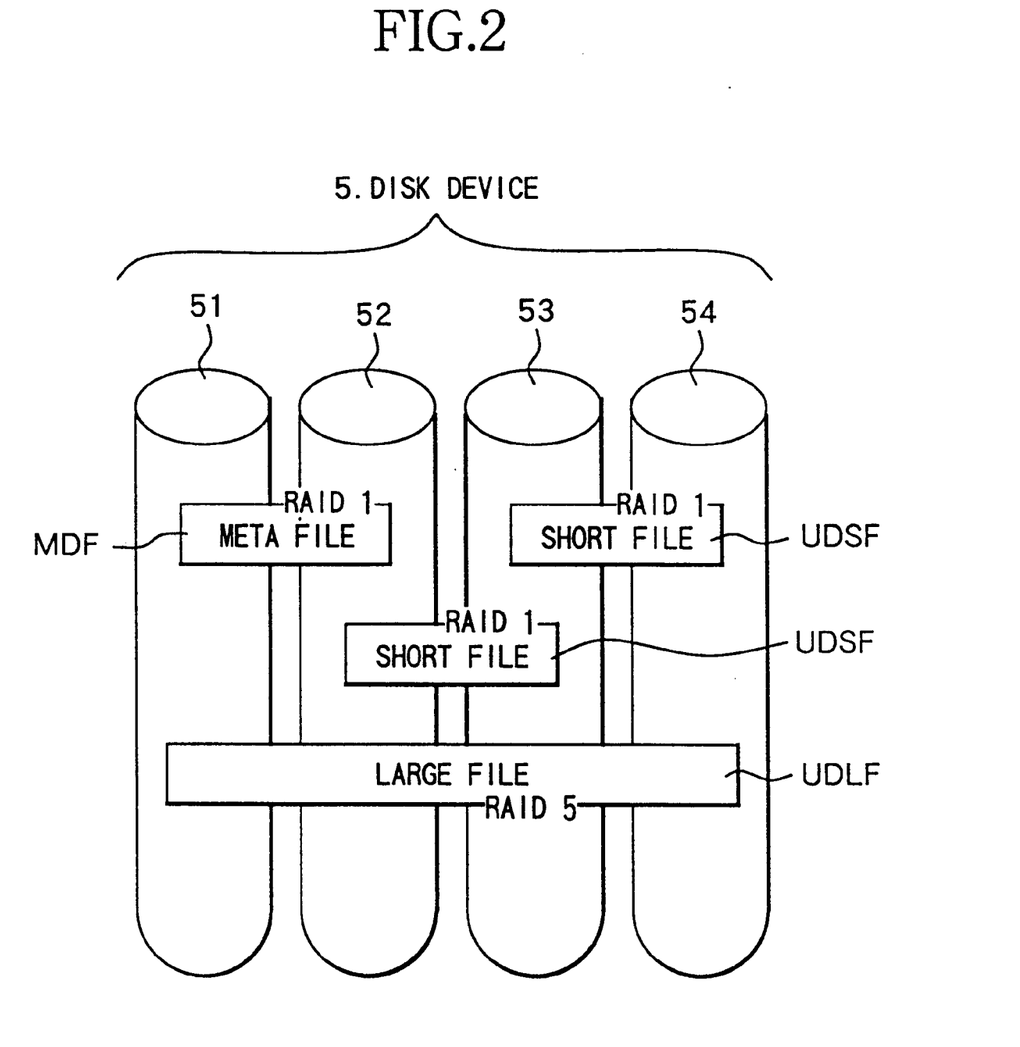
FIG. 2 is a block diagram showing an example of how data are stored in a disk device in FIG. 1.

FIG. 2 shows an example of storing the data in the disk device 5 shown in FIG. 1. Herein, the meta data MD are stored in the two top disk devices 51, 52 in a disk pool, while the user data UD are stored in all the disk devices 51, 52, 53 and 54. Note that a dedicated disk device may also be prepared for storing the meta data MD. The user data UD, with a redundancy method being determined based on a size of the file as far as the user does not specify, are arranged in dispersion in the plurality of disk devices selected on a file-basis. Further, the meta data MD are stored by a duplex redundancy method.

In the data storage example shown in FIG. 2, the meta data MD are stored in a region of a RAID level 1, thus structuring a meta file MDF. Further, the user data UD are stored in regions of the RAID level 1 and a RAID level 5, thus structuring a short file (less than one block) UDSF and a large file (over two blocks) UDLF).

Figure 3:
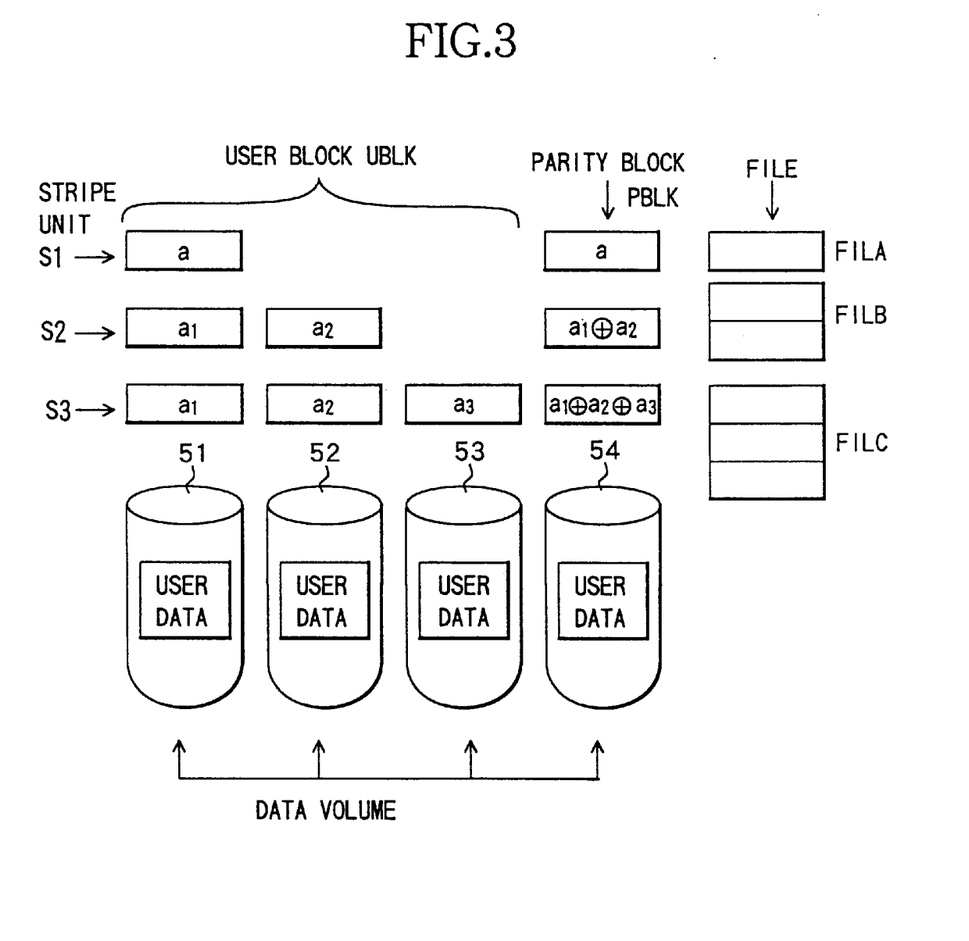
FIG. 3 is an explanatory block diagram showing an arrangement of parity blocks in the disk device, and a parity calculation method.

FIG. 3 is an explanatory diagram showing how parity blocks PBLK are arranged, and a parity calculation method. Parity data is created corresponding to a predetermined number of stripes (S) or the number of stripes which is specified on the file basis by the user. Namely, parity blocks PBLK1, PBLK2 and PBLK3 are singly added to stripe units S1, S2 and S3 structured by segmenting the user file UDF corresponding to S-pieces of blocks. The disk device for storing the user data UD and the parity data PD is determined from within the disk pool on the file-basis when creating the file. Herein, when the-number-of-stripes S is

[3], there is shown how the parity blocks PBLK1, PBLK2 and PBLK3 are determined. As in the case of a file FILA, when only one user block UBLK exists in the stripe unit S1, the parity block PBLK1 having the same content [a] is created. Further, as in the case of a file FILB or FILC, when two or more user blocks UBLK exist, data obtained by taking exclusive OR of contents [a1, a2] or [a1, a2, a3] of the a plurality of blocks, is written to the parity block PBLK2 or PBLK3. For example, the file FILC is arranged in stripe on three data volumes a1, a2 and a3, and the parity data is stored in the fourth data volume. The data volume, on which the parity data is stored is decided from the disk pool dynamically.

Figure 4:
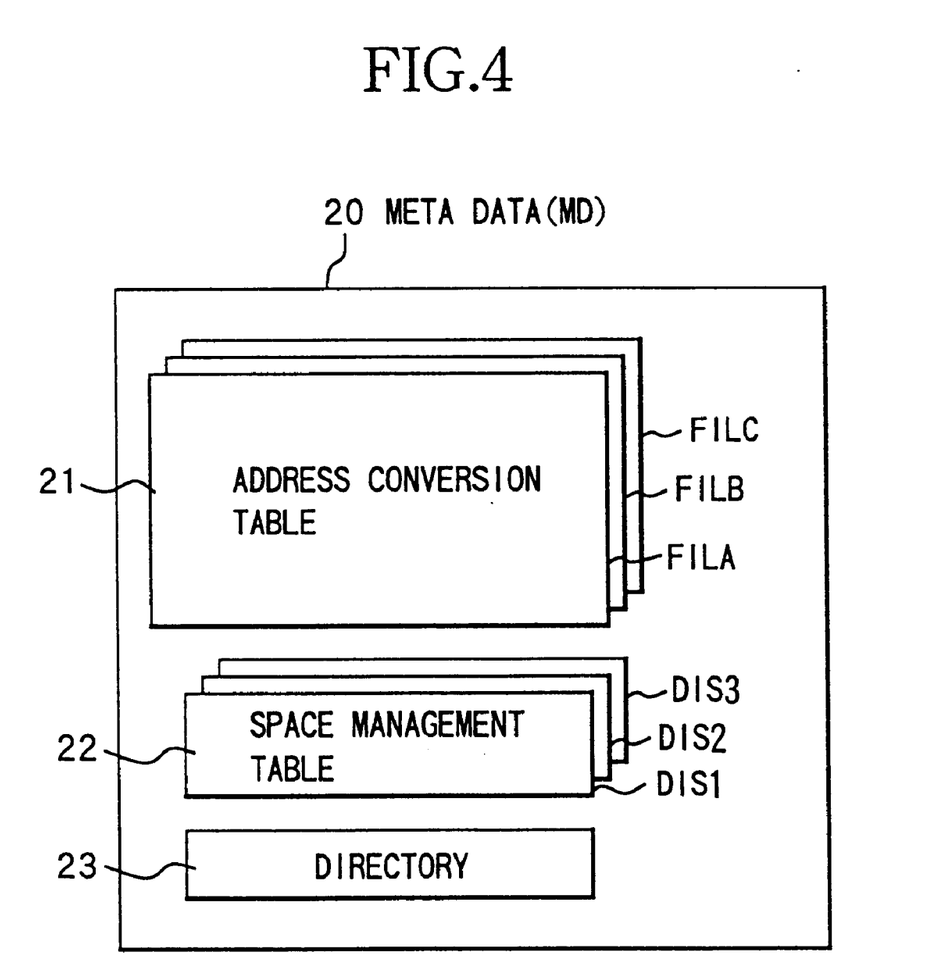
FIG. 4 is a block diagram showing an example of a structure of meta data stored in the disk device in FIG. 1.

FIG. 4 shows a structure of the meta data MD. The meta data (MD) 20 is provided with an address conversion table 21 created on a file FILA, FILB and FILCA basis, a space management table 22, created on a disk device DIS1, DIS2 and DIS3 basis, for managing a free area of each disk device, and a directory 23 for converting a file name into a file number and indexing the address conversion table 21.

Figure 5:
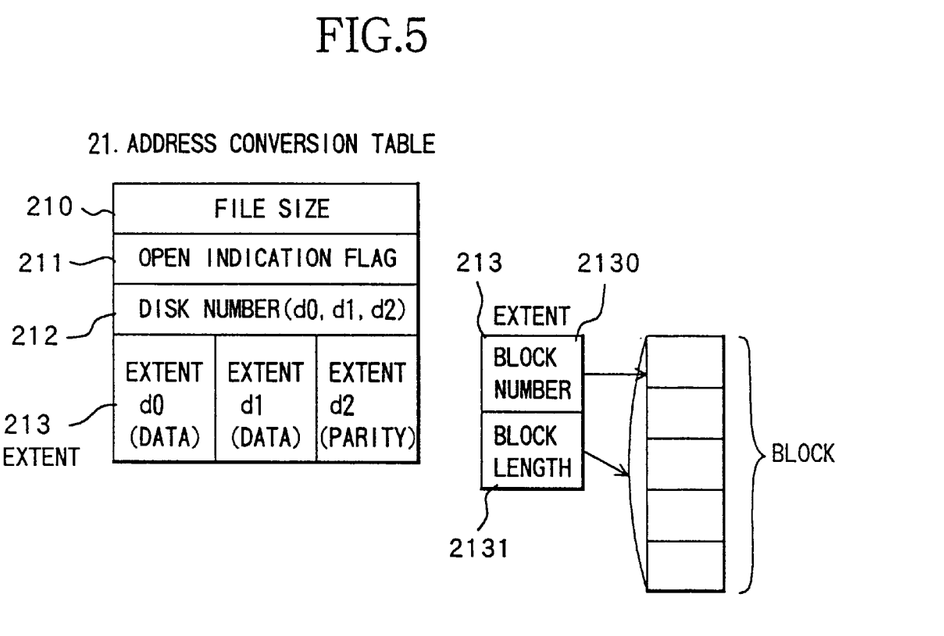
FIG. 5 is a block diagram showing an example of a structure of an address conversion table in the meta data in FIG. 4.

FIG. 5 shows in details a structure of the address conversion table 21 in FIG. 4. The address conversion table 21 contains a file size 210, an open indication flag 211, the numbers (disk numbers: d0, d1, d2) 212 of the disk devices stored with the file data, and extent 213, i.e., position data, provided for every disk device, for indicating which block of the disk device is used. Each of the extent 213 contains a start-of-extent block number 2130 and a block length (the number of blocks) 2131.

The file system 1 described above, if a device fault occurs in the disk device, searches for a file using the troubled disk device by sequentially reading all the contents of the address conversion tables 21 in the meta data 20. If the file is detected, the file system 1 selects a new disk device in the disk pool, which is not yet allocated to that file, then writes the data recovered from the data on the remaining devices to the block on the selected disk device, and updates the address conversion table 21. The address conversion table 21 has the open indication flag 211 for showing that the file is open in an update mode. This flag 211 is set in an open unit (designated by 11 in FIG. 1) of the file system 1 and is reset in a close unit (14). When restarted after system down, the address conversion table 21 in the meta data 20 is sequentially read, and the parity data is recalculated with respect to the file in which the open indication flag 211 is set and written back to the parity block.

Figure 6:
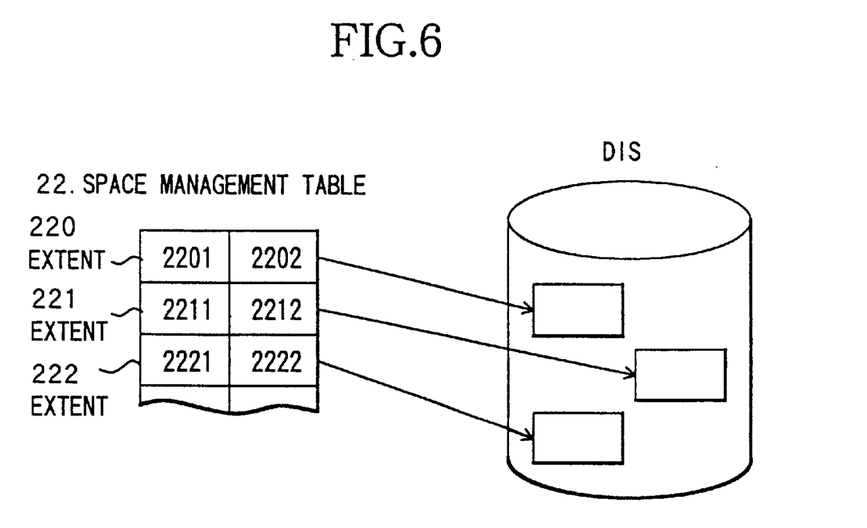
FIG. 6 is a block diagram showing an example of a structure of a space management table in the meta data in FIG. 4.

FIG. 6 shows a detailed structure of the space management table 22 in FIG. 4. The space management table 22 for managing the free area of each disk device is so provided that the table 22 can be indexed by the disk numbers DIS1, DIS2 and DIS3 of the respective disk devices. The respective extent 220, 221 and 222 are composed of the start-of-extent block numbers 2201, 2211 and 2221 and the block lengths 2202, 2212 and 2222, and each indicate the free area of the disk device DIS. When adding the disk device, a new space management table 22 indicating that the whole is free is written to the meta data 20. With this process, a disk block allocation unit (designated by 15 in FIG. 1) treats this disk device as a candidate for a block allocation.

Next, an operation of the file management system will be described in conjunction with FIGS. 1 to 6. The file system 1 manages an arbitrary number of disk devices 51, 52, 53 and 54 constituting the disk pool, and stores the user data UD in the plurality of disk devices according to the RAID level 1 or the RAID level 5 in response to a request of the user program 9. When requested by the user program 9 to create the file, the open unit 11 of the file system 1 receives the control, and puts the address conversion table 21 indicating this file into the meta data (MD) 20, and registers the file name and the file number corresponding to the file in the directory 23. Thereafter, when the user program makes a request for writing the data, a write unit 12 receives the control, and requests a cache control unit 13 to allocate a cache (cache memory). The cache control unit 13 allocates a cache block, and the control is returned to the write unit 12.

When the write unit 12 writes the user data UD to the cache block returned from the cache control unit 13, the operation returns to the user program 9. When having finished writing the data of the newly created file, the user program 9 issues a close of the file. As a result, the close unit 14 receives the control, calls the disk block allocation unit 15 to allocate the disk block, and writes the data cached so far and the parity data PD to the disk block. Thereafter, an address of the newly allocated disk block is set in the address conversion table 21 in the meta data 20.

When the user program makes a request for reading the file, the control is transferred to the read unit 16. The read unit 16 calls the cache control unit 13 to read the user data UD from the disk device into the cache. If a block on the disk device is broken with the result that this reading process is ended up with a failure, the read unit 16 is notified of the disk block fault.

The read unit 16 receiving this notification, after seeking and reading a block group needed for recovering the data out of the address conversion table 21, recovers the data in the troubled block by use of the data in the read-in block. Upon a completion of the data recovery, a new block is allocated onto the troubled disk device, and, after the recovered data are written to the new block, the address conversion table 21 in the disk device is rewritten.

Although only one embodiment of this invention has been described in detail above, those skilled in the art will readily appreciate that many modifications are possible in the preferred embodiment without departing from the novel teachings and advantages of this invention. Accordingly, all such modifications are intended to be included within the scope of his invention as defined by the following claims.

What is claimed is:

1. A file management system comprising:
    a plurality of disk devices, managed in the form of a disk pool, of which at least two disk devices are dynamically selected from said disk pool, constituting a plurality of files storing in redundancy any one set of data of user data and meta data for managing how the user data are used; and
    a file system, constituting a part of an operating system of a host computer, managing said plurality of disk devices as said disk pool and managing en bloc the files, based on the meta data, wherein the meta data is stored on a file-basis with an address conversion table including a disk number of said disk device stored with the user data, and a disk block number corresponding to an intra-disk relative block number.

2. A file management system according to claim 1, wherein said file system, in the case of a file of less than one block, selects two of said plurality of disk devices in said disk pool, and makes the user data stored in the redundancy of a RAID level 1.

3. A file management system according to claim 2, wherein said file system, in the case of a file of over two blocks, selects three or more of said plurality of disk devices in said disk pool, and makes the user data stored in the redundancy of a RAID level 5.

4. A file management system according to claim 3, wherein said file system makes the meta data stored in predetermined two of said plurality of disk devices in said disk pool in the redundancy of the RAID level 1.

5. A file management system according to claim 1, wherein if a file block fault occurs in a target disk device when said file system accessing the file, a disk block group needed for recovering contents of the block with the fault is obtained from said address conversion table, the disk block group is read, the data of the block with the fault are recovered from the data read therefrom, the recovered data are written to a newly-allocated normal block in said same disk device, and the newly-allocated disk block number is reflected in said address conversion table.

6. A file management system according to claim 1, wherein if a fault of said disk device occurs, a disk block group needed for recovering contents of the block of said failed disk device is obtained from said address conversion table, the disk block group is read, the data of said failed disk device are recovered from the data read therefrom, the recovered data are written to a newly-allocated normal block in said other disk devices not used for the particular file, and the newly-allocated disk block numbers and the newly-allocated disk number are reflected in said address conversion table.

7. A file management system according to claim 1, wherein when restarted after system down, said file system reads sequentially the address conversion table in the meta data, recalculates the parity data with respect to the file in which an open indication flag is set, and writes back the recalculated parity data to the parity block in the file.

8. A file management system comprising:
a plurality of disk devices, managed in the form of a disk pool, of which at least two disk devices are dynamically selected from said disk pool, constituting a plurality of files storing in redundancy any one set of data of user data and meta data for managing how the user data are used; and
a file system, constituting a part of an operating system of a host computer, managing said plurality of disk devices as said disk pool and managing en bloc the files, based on the meta data, wherein said file system, in the case of file of less than one block, selects two of said plurality of disk devices in said disk pool, and makes the user data stored in the redundancy of a RAID level 1, wherein said file system, in the case of a file of over two blocks, selects three or more of said plurality of disk devices in said disk pool, and makes the user data stored in the redundancy of a RAID level 5, wherein said file system makes the meta data stored in predetermined two of said plurality of disk devices in said disk pool in the redundancy of the RAID level 1, wherein the meta data is stored on a file-basis with an address conversion table including a disk number of said disk device stored with the user data, and disk block number corresponding to an intra-disk relative block number.

9. A file management system according to claim 8, wherein if a block fault occurs in a target disk device when said file system accessing the file, a disk block group needed for recovering contents of the block with the fault is obtained from said address conversion table, the disk block group is read, the data of the block with the fault are recovered from the data read therefrom, the recovered data are written to a newly-allocated normal block in said same disk device, and the newly-allocated disk block number is reflected in said address conversion table.

10. A file management system according to claim 9, wherein said file system caches the user data when writing the data in order to restrain an occurrence of recalculation of the parity data, and delays an allocation of the disk block till the file is closed or said cache becomes full.

11. A file management system according to claim 10, wherein if a fault of said disk device occurs, a disk block group needed for recovering contents of the block of said failed disk device is obtained from said address conversion table, the disk block group is read, the data of said failed disk device are recovered from the data read therefrom, the recovered data are written to a newly-allocated normal block in said other disk devices not used for the particular file, and the newly-allocated disk block numbers and the newly-allocated disk number are reflected in said address conversion table.

12. A file management system according to claim 11, wherein when restarted after system down, said file system reads sequentially the address conversion table in the meta data, recalculates the parity data with respect to the file in which an open indication flag is set, and writes back the recalculated parity data to the parity block in the file.

13. A file management system comprising:
a plurality of disk devices, managed in the form of a disk pool, of which at least two disk devices are dynamically selected from said disk pool, constituting a plurality of files storing in redundancy any one set of data of user data and meta data for managing how the user data are used; and
a file system, constituting a part of an operating system of a host computer, managing said plurality of disk devices as said disk pool and managing en bloc the files, based on the meta data, wherein said file system caches the user data when writing the data in order to restrain an occurrence of recalculation of the parity data, and delays an allocation of the disk block till the file is closed or said cache becomes full.

* * * * *

UNITED STATES PATENT AND TRADEMARK OFFICE
CERTIFICATE OF CORRECTION

PATENT NO. : 6,675,176 B1
DATED : January 6, 2004
INVENTOR(S) : Yoshitake Shinkai et al.

It is certified that error appears in the above-identified patent and that said Letters Patent is hereby corrected as shown below:

Title page,
Item [54], Title, please delete "FILE MANAGEMENT SYSTEM" and insert -- FILE SYSTEM STORING EACH FILE ON PLURAL DISKS REDUNDANTLY WITH SEPARATE RAID LEVEL --

Column 8,
Line 52, please insert Claim 14
-- 14. A file management system comprising:
   a plurality of disk device, managed in the form of a disk pool, of which at least two disk devices are dynamically selected from said disk pool, constituting a plurality of files storing in redundancy any one set of data of user data and meta data for managing how the user data are used; and
   a file system, constituting a part of an operating system of a host computer, managing said plurality of disk device as said disk pool and making the user data stored in the redundancy of a RAID level which is managed with respect to each file, based on the meta data, wherein said meta ata somprises an address table created on a file bases, a space management table created on a disk device basis, and a directory converting a file name into a file number and indexing the address conversion table. --

Signed and Sealed this

Fourteenth Day of September, 2004

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,675,176 B1 |
| APPLICATION NO. | : 09/397865 |
| DATED | : January 6, 2004 |
| INVENTOR(S) | : Yoshitake Shinkai et al. |

It is certified that error appears in the above-identified patent and that said Letters Patent is hereby corrected as shown below:

Title page,
Item [54], Title, please delete "FILE MANAGEMENT SYSTEM" and insert -- FILE SYSTEM STORING EACH FILE ON PLURAL DISKS REDUNDANTLY WITH SEPARATE RAID LEVEL --

Column 8,
Line 52, please insert Claim 14
-- 14.   A file management system comprising:
 a plurality of disk device, managed in the form of a disk pool, of which at least two disk devices are dynamically selected from said disk pool, constituting a plurality of files storing in redundancy any one set of data of user data and meta data for managing how the user data are used; and
 a file system, constituting a part of an operating system of a host computer, managing said plurality of disk device as said disk pool and making the user data stored in the redundancy of a RAID level which is managed with respect to each file, based on the meta data, wherein said meta data comprises an address conversion table created on a file basis, a space management table created on a disk device basis, and a directory converting a file name into a file number and indexing the address conversion table. --

This certificate supersedes Certificate of Correction issued September 14, 2004.

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,675,176 B1 | Page 1 of 1 |
| APPLICATION NO. | : 09/397865 | |
| DATED | : January 6, 2004 | |
| INVENTOR(S) | : Yoshitake Shinkai et al. | |

It is certified that error appears in the above-identified patent and that said Letters Patent is hereby corrected as shown below:

Title page,
Item [54], Title, please delete "FILE MANAGEMENT SYSTEM" and insert -- FILE SYSTEM STORING EACH FILE ON PLURAL DISKS REDUNDANTLY WITH SEPARATE RAID LEVEL --

Column 8,
Line 52, please insert Claim 14
-- 14.   A file management system comprising:
   a plurality of disk device, managed in the form of a disk pool, of which at least two disk devices are dynamically selected from said disk pool, constituting a plurality of files storing in redundancy any one set of data of user data and meta data for managing how the user data are used; and
   a file system, constituting a part of an operating system of a host computer, managing said plurality of disk device as said disk pool and making the user data stored in the redundancy of a RAID level which is managed with respect to each file, based on the meta data, wherein said meta data comprises an address conversion table created on a file basis, a space management table created on a disk device basis, and a directory converting a file name into a file number and indexing the address conversion table. --

This certificate supersedes Certificate of Corrections issued September 14, 2004 and September 19, 2006.

Signed and Sealed this

First Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 6,675,176 B1
APPLICATION NO. : 09/397865
DATED : January 6, 2004
INVENTOR(S) : Yoshitake Shinkai et al.

It is certified that error appears in the above-identified patent and that said Letters Patent is hereby corrected as shown below:

Title page,
Item [54], Title, please delete "FILE MANAGEMENT SYSTEM" and insert -- FILE SYSTEM STORING EACH FILE ON PLURAL DISKS REDUNDANTLY WITH SEPARATE RAID LEVEL --

Column 8,
Line 52, please insert Claim 14
-- 14.   A file management system comprising:
     a plurality of disk devices, managed in the form of a disk pool, of which at least two disk devices are dynamically selected from said disk pool, constituting a plurality of files storing in redundancy any one set of data of user data and meta data for managing how the user data are used; and
     a file system, constituting a part of an operating system of a host computer, managing said plurality of disk devices as said disk pool and making the user data stored in the redundancy of a RAID level which is managed with respect to each file, based on the meta data, wherein said meta data comprises an address conversion table created on a file basis, a space management table created on a disk device basis, and a directory converting a file name into a file number and indexing the address conversion table. --

This certificate supersedes all previously issued Certificate of Corrections.

Signed and Sealed this

First Day of July, 2008

JON W. DUDAS
*Director of the United States Patent and Trademark Office*